May 20, 1969 RICHARD H. YEN 3,445,818
MEMORY ACCESSING SYSTEM
Filed Aug. 1, 1966
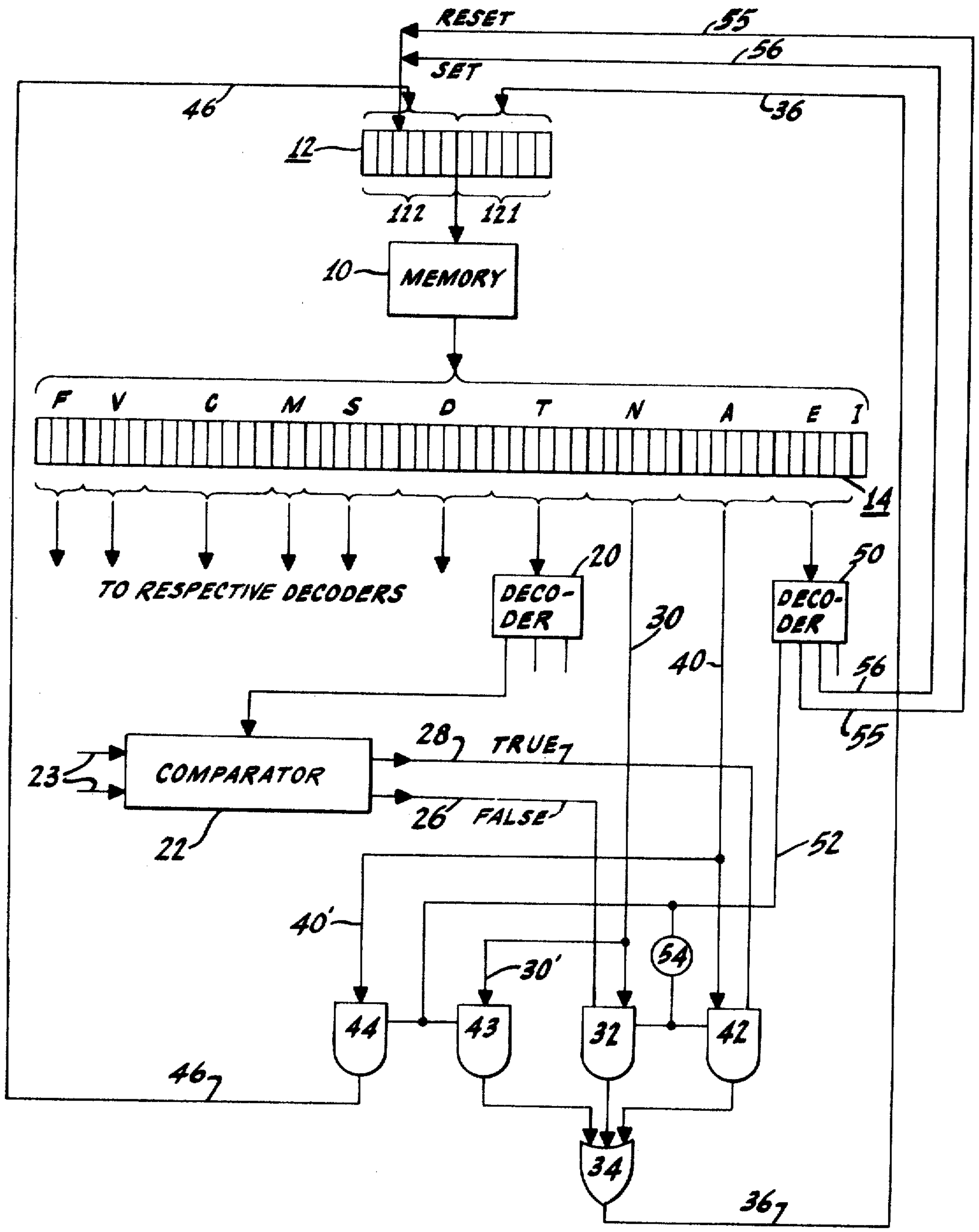
INVENTOR.
RICHARD H. YEN
BY
Carl V. Olson
Attorney

United States Patent Office 3,445,818

Patented May 20, 1969

3,445,818

MEMORY ACCESSING SYSTEM

Richard H. Yen, Cherry Hill, N.J., assignor to Radio Corporation of America, a corporation of Delaware Filed Aug. 1, 1966, Ser. No. 569,470

Int. Cl. G11b *13/00*

U.S. Cl. 340—172.5 5 Claims

ABSTRACT OF THE DISCLOSURE

A random-access memory system in which each stored word contains information used in determining the next word to be accessed. The next address field of each stored word contains only enough bits to access any word in the memory. Half of the next address field is normally used to provide a next address in a nearby part of the memory. The other half of the next address field is used on the occurrence of a branching condition in the computer to provide an alternate next address in a nearby part of the memory. Both halves of the next address field are used to provide a next address in many more remote part of the memory.

This invention relates to memory accessing systems, and particularly to a memory system in which each stored word contains information used in determining the next word to be accessed. While not limited thereto, the memory accessing system of the invention is particularly useful when applied to a read-only memory storing elementary operation words in a computer or data processor in which each instruction is executed by executing a unique sequence of elementary operations.

General purpose computers have usually been constructed to execute each instruction by employing a decoder to decode an instruction, and by using the output of the decoder in combination with timing pulses to enable gates which control appropriate signal transfers in the computer processor. The system organization is such that signals may be passed to a given register, for example, by a number of gates each enabled from a different instruction decoder output.

Another way to construct a general purpose computer is to employ an instruction decoder output to cause the accessing of a unique sequence of elementary operation words from a read-only memory. Each accessed elementary operation word is decoded to control transfers of signals in the computer processor. An elementary operation word may be utilized by a number of different instructions. By way of example, an actual computer has provision for about 140 instructions and 2048 elementary operation words. An instruction may utilize anywhere from 5 to 200 elementary operation words. A single elementary operation word may, for example, be used to control the transfer of signals to the given register mentioned above whenever such a transfer is needed in the execution of any one of many different instructions. The same elementary operation word and the same gates are used whenever a transfer to the given register is required. This organization involving elementary operation words stored in a read-only memory can result in a considerable simplification of the control gating complex in a computer processor. The computer organization also has the advantage that by adding or substituting a different read-only memory storing an appropriate set of elementary operation words, the computer can be made to "emulate" another computer in the execution of programs written for the other computer.

In a computer system organization utilizing elementary operation words stored in a read-only memory, each instruction, when decoded, results in the accessing of an appropriate first one of the elementary operation words. Portions or fields of the accessed elementary operation word are decoded to control certain signal transfers in the computer processor. Each accessed elementary operation word also includes a next address field which is used to automatically access the next following elementary operation word for the execution of the next following elementary operation. The next address field of each elementary operation word should contain enough bits to address any one of the elementary operation word storage locations. An elementary operation word read-only memory actually constructed includes 4096 elementary operation words. A 12-bit address is needed to identify any one of 4096 word locations. Therefore, each elementary operation word includes a next address field of twelve binary bits.

The sequence of elementary operations to be performed in the execution of a given instruction is not always fixed, but may be conditioned on the results of certain signal comparisons or tests. It is therefore necessary that many elementary operation words contain enough next address information to identify a normal next address and an alternative next address to be used on the occurrence of an output from a signal comparator. However, the extension of each elementary word to include an additional twelve bits for an alternate next address is unduly expensive and may be precluded by space limitations and other factors.

It is therefore a general object of this invention to provide an improved memory system wherein each stored word contains enough bits to address any one of the words in the memory, and wherein within this limitation, it is still possible to generate the address of either a normal next-accessed word or an alternate-next-accessed word depending on signal conditions found to exist during decoding of the presently-accessed word.

In accordance with an example of the invention, there is provided a read-only memory storing a plurality of words each of which includes a field for a normal next address and a field for an alternate next address. The combined number of bits in both of the next address fields are equal to the number of bits necessary to address any one of all of the words stored in the memory. The contents of the normal next address field of an accessed word is normally used as a portion of a new address for the next-accessed word. Alternatively, on the occurrence of an external condition, the alternate next address field of the accessed word is used as the portion of a new address for the next-accessed word. The new addresses thus generated are limited to addresses within a block of addresses determined by the number of bits in the changed portion of the new address. The generation of a new address located some blocks away in the memory is accomplished by decoding another field of the accessed word and causing a change of at least one bit in another portion of the complete address used for accessing the next word. A next address for a word located anywhere in the memory is generated by utilizing the contents of both the normal next address field and the alternate next address field of an accessed word for generating a new next address. The next address so generated is unconditionally used as the next address, i.e., it cannot be one of two addresses selected by an external condition.

The sole figure of the drawing is a schematic diagram of a memory system having means according to the invention for the generation from each accessed word of the address of the next word to be accessed.

Referring now in greater detail to the drawing, there is shown random access a memory 10 for the storage of a large number, such as 4096, of words, each of which may, according to a specific example, include fifty-three bits.

The memory 10 may be a read-only memory constructed so that the reading out of any selected word does not destroy the stored information and therefore does not require the subsequent rewriting of the read-out information. Any one of the words stored in memory 10 may be selected or accessed by the contents of a memory address register 12. Continuing the example, the memory address register 12 may contain space for an address consisting of twelve address bits, which is the number of address bits required to uniquely select any one of 4096 word locations in memory 10. The memory address register 12 is divided into a first portion 121 of six lower-order bits, and a second portion 122 of six higher-order bits.

When a word in memory 10 is addressed by its respective address in the memory address register 12, the word stored in memory 10 is transferred to a memory data register 14. The memory data register is shown to consist of a register for storing the fifty-three bits of an accessed memory word. The fifty-three bits of each stored memory word are divided into several fields designated F, V, C, M, S, D, T, N, A, E and I. The contents of most of the fields are applied to respective decoders (not shown) each having a number of outputs equal to $2^n$ where $n$ is equal to the number of bits in the respective field. Any given pattern of "1" and "0" bits in a field determines the energization of a unique one of the outputs of the corresponding decoder.

Each of the words accessed from memory 10 to the memory data register 14 includes a normal next address field N of six bits, and includes an alternate next address field A of six bits. There is also a test field T consisting of six bits. The contents of the test field T is decoded by a decoder 20 having a number of outputs one of which is energized by a respective unique "1" and "0" bit pattern in T field. At least one of the outputs of the decoder 20 is connected to a signal comparison means 22 which has a "false" output 26 and a "true" output 28. The signal comparison means 22 also has signal inputs 23 for signals to be compared. The signal comparator 22 is a conventional computer or data processor component for comparing signals in the computer to detect any of many conditions such as a count reading a preset value, an overflow condition in a numerical operation, a magnitude comparison, a sign comparison, a parity check, etc. Normally, the "false" output 26 of the comparison means 22 is energized, and the "true" output 28 is energized only when the signal comparison means 22 is activated by the decoder 20 and the signals applied to input leads 23 satisfy a "true" condition.

The contents of the normal next address field N of the memory data register 14 is coupled over a six-conductor bus 30, through a bank of six "and" gates designated 32, through a bank of six "or" gates designated 34 and over a six-conductor bus 36 to the first portion 121 of memory address register 12. The contents of the alternate next address field A in memory data register 14 is coupled over a six-conductor bus 40, a bank of six "and" gates 42, the bank of six "or" gates 34 and the six-conductor bus 36 to the first portion 121 of memory address register 12. The "false" output 26 of comparator 22 is connected in enabling fashion to the "and" gates 32. The "true" output 28 from comparator 22 is connected in enabling fashion to the "and" gates 42.

The contents of the normal next address field N is also coupled through bus 30, bus 30', "and" gates 43, "or" gates 34 and bus 36 to the first portion 121 of memory address register 12. The contents of the alternate next address field A is also coupled through bus 40, bus 40', "and" gates 44 and bus 46 to the second portion 122 of memory address register 12.

The contents of the E field of the memory data register 14 is coupled to a decoder 50. The output of the decoder 50 includes an "unconditional" output line 52 connected to enabling inputs of "and" gates 43 and 44, and connected through an inverter 54 to "and" gates 32 and 42. The decoder output 52 is normally not energized, so that it normally tends to enable "and" gates 32 and 42, and to inhibit "and" gates 43 and 44. The decoder 50 also includes a "backward" output 55 connected to the reset input of the $2^9$ bit in the second portion 122 of the memory address register 12. The decoder 50 also includes a "forward" output 56 connected to the set input of the $2^9$ bit in the second portion 122 of the memory address register 12. The use of outputs 55 and 56 from decoder 50 to reset and set the $2^9$ bit is simply illustrative of means to change at least one bit in the second portion 122 of the memory address register 12.

In the construction of a computer including an elementary operation word memory system as shown in the drawing, the computer designer starts with a list of instructions which the computer is to be capable of executing. Each instruction is analyzed in terms of the computer processor hardware to determine the sequence of elementary operations necessary to accomplish execution of the instruction. The designer determines the contents of elementary operation words which, when decoded in sequence and acted upon, will accomplish execution of each instruction. The designer utilizes each elementary operation word whenever appropriate in all instructions. The sequence in which elementary operation words are utilized is determined by the contents of the normal next address field and the alternate next address field in each elementary operation word. The designer in assigning addresses to the elementary operation words in a sequence of elementary operation words required to execute an instruction, normally (when possible) assigns addresses within a block of sixty-four locations in the memory. This is because each word includes a next address field of only six bits, which are capable of identifying any one of sixty-four memory word locations. The six bits of the next address field when applied to the first portion 121 of the memory address register 12 select the particular one of sixty-four word locations in the one of sixty-four memory blocks determined by the six bits remaining in the second portion 122 of the memory address register 12. When a next-accessed word cannot have an address within the sixty-four-word block, the designer utilizes one of three of the thirty-two bit combination in the five-bit E field.

In the operation of the system shown in the drawing, it is assumed that a computer instruction has been decoded and has resulted in the transfer to the memory address register 12 of the address of the first one of the elementary operation words required in the execution of the instruction. The address in the memory address register 12 is used to access the corresponding elementary operation word from the memory 10 and transfer it to the memory data register 14. Various fields of the elementary operation word in the memory data register 14 are decoded and used to effect appropriate signal transfers in the computer processor. The elementary operation word in data register 14 is assumed to be one in which the normal next address field N identifies a normal next elementary operation word having an address within the same block of sixty-four addresses. The contents of the normal next address field N is applied through bus 30, "and" gates 32, "or" gates 34 and bus 36 to the first portion 121 of the memory address register 12. Thereafter, the changed address located in the memory address register 12 to used to access the next following elementary operation word.

If the next elementary operation word accessed to the memory data register 14 is an elementary operation word followed conditionally by one or the other of two different elementary operation words, the contents of the test field T is decoded in decoder 20, which, in turn energizes the comparator 22. The comparator 22 normally provides a false output on lead 26, and provides a true output on lead 28 if the tested condition requires an alternate next elementary operation word. In this case, the true output on lead 28 enables the "and" gates 42 to pass the alternate next address field A from data register 14 through bus 40, "and" gates 42, "or" gates 34 and bus 36 to the first portion 121 of the memory address register 12. The changed address now in the address register 12 is used to access the next following alternate elementary operation word, which is one of sixty-four words in the block of memory locations determined by the contents remaining in the second portion 122 of the address register 12.

It is now assumed that the accessed elementary operation word in the memory data register 14 is a word which must be followed by an elementary operation word located outside the block of memory locations identified by the contents of the second portion 122 of the address register 12. In this case, the E field of the accessed word contains information which, when decoded by the decoder 50, results in the energization of decoder output 55 or decoder output 56. The energization of one of these decoder outputs causes a setting or a resetting of the $2^9$ bit in the second portion 122 of the address register 12. The address in the address register 12 is then an address in a block of addresses eight blocks removed from the block containing the previous address.

The foregoing change of the $2^9$ bit in the second portion 122 of the address register may, or may not, be accompanied by a change in the first portion 121 of the address register 12. The contents of the T, N and A fields of the accessed word may be the same as corresponding contents of the previously accessed word, or they may be different from that of the previously accessed word. If the contents of these fields are the same as the previously accessed word, no change is made in the first portion 121 of the address register 12. On the other hand, if the contents of any of these fields are different, a simultaneous change may be made to the contents of the first portion 121 of the address register 12 in the manner that has already been described.

It is now assumed that the accessed elementary operation word in the data register 14 is a word requiring the next-accessed elementary operation word to be a word anywhere in the memory at a place not addressable by means which have already been described. In this case, the E field of the accessed word in data register 14 is such that when it is decoded by decoder 50, the decoder provides an output on lead 52 calling for an unconditionally generated next address of twelve bits. The decoder output on lead 52 enables "and" gates 43 and 44, and through inverter 54, disables "and" gates 32 and 42. Under these conditions, the contents of the normal next address field N is applied through bus 30, bus 30′, "and" gates 43, "or" gates 34 and bus 36 to the first portion 121 of memory address register 12. At the same time, the contents of the alternate next address field A of data register 14 is applied through bus 40, bus 40′, "and" gates 44 and bus 46 to the second portion 122 of address register 12. It is seen that under these conditions the combined contents of the next address fields N and A are employed as a complete new address to access an elementary operation word located anywhere in the memory 10.

To summarize, the memory accessing system is one in which each accessed word contains a number of bits sufficient to identify a next-accessed word located anywhere in the memory. The system is additionally characterized in that the next address field is divided into two parts which may be conditionally employed to generate a normal next address or an alternate next address within a block of sixty-four addresses upon the occurrence of a tested condition in the computer. The system is further characterized in having means to generate a normal next address or an alternate next address in a block of memory locations displaced from the block containing the presently accessed word. The system employs a minimum number of bits in the next address fields, and yet provides a sufficient freedom in next address generation to equal the results obtainable in a memory having memory words containing many more bits for the next address fields.

What is claimed is:

1. For use with a data processor including a comparator means, the combination of:

a random-access memory storing a plurality of words, a memory address register for selecting any word in the memory, a memory data register for receiving a word read from the memory, each word including a field for a normal next address and a field for an alternate next address, the number of bits in each of said next address fields being less than the number of bits in said memory address register, means to normally transfer the contents of the normal next address field from the memory data register to a first portion of said memory address register, and means operative on the occurrence of a "true" output from said comparator means to transfer the contents of the alternate next address field from the memory data register to said first portion of said memory address register.

2. The combination as defined in claim 1, and in addition, means to decode a portion of a word in said memory data register to conditionally change at least one bit in a second portion of said memory address register.

3. The combination as defined in claim 1, and in addition, means to decode a portion of a word in said memory data register to conditionally cause the transfer of the contents of the normal next address field and the alternate next address field from the memory data register to respective first and second portions of said memory address register.

4. The combination as defined in claim 1, and in addition, means to decode a portion of a word in said memory data register to conditionally change at least one bit in a second portion of said memory address register, and means to decode a portion of a word in said memory data register to conditionally cause the transfer of the contents of the normal next address field and the alternate next address field from the memory data register to respective first and second portions of said memory address register.

5. In a computer including a comparator means, the combination of:

a random-access read-only memory, storing a plurality of words, a memory address register having a sufficient number of bits to select any word in the memory, a memory data register for receiving a word read from the memory, each word including a field for a normal next address and a field for an alternate next address, the combined number of bits in both of said next address fields equaling the number of bits in said memory address register, means to normally transfer the contents of the normal next address field from the memory data register to a first portion of said memory address register, means to decode a portion of a word in said memory data register to cause said comparator means to conditionally provide an output, means operative on the occurrence of a true output from said comparator means to transfer the contents of the alternate next address field from the memory data register to said first portion of said memory address register, means to decode a portion of a word in said memory data register to conditionally change at least one bit in a second portion of said memory address register, and means to decode a portion of a word in said memory data register to conditionally cause the transfer of the contents of the normal next address field and the alternate next address field from the memory data register to respective first and second portions of said memory address register.

(References on following page)

References Cited

UNITED STATES PATENTS

| | | | |
|---|---|---|---|
| 3,015,441 | 1/1962 | Rent et al. ______ | 340—172.5 X |
| 3,094,610 | 6/1963 | Humphrey et al. __ | 340—172.5 X |
| 3,160,858 | 12/1964 | Adams et al. ______ | 340—174 X |
| 3,270,318 | 8/1966 | Strawbridge _______ | 340—174 X |
| 3,350,691 | 10/1967 | Faulis et al. _______ | 340—173 X |

ROBERT C. BAILEY, *Primary Examiner.*

PAUL R. WOODS, *Assistant Examiner.*